United States Patent
Gamble

(10) Patent No.: US 8,702,351 B2
(45) Date of Patent: Apr. 22, 2014

(54) CUTTER BODY AND LOCKING SCREW THEREFOR

(75) Inventor: Kevin Michael Gamble, Stahlstown, PA (US)

(73) Assignee: Kennametal Inc., Latrobe, PA (US)

( * ) Notice: Subject to any disclaimer, the term of this patent is extended or adjusted under 35 U.S.C. 154(b) by 448 days.

(21) Appl. No.: 13/034,245

(22) Filed: Feb. 24, 2011

(65) Prior Publication Data

US 2012/0219368 A1   Aug. 30, 2012

(51) Int. Cl.
*B23C 5/26* (2006.01)

(52) U.S. Cl.
USPC ............. 407/40; 409/234; 411/190; 407/47

(58) Field of Classification Search
USPC .......... 409/234; 279/8, 76, 83; 407/40, 47, 35
See application file for complete search history.

(56) References Cited

U.S. PATENT DOCUMENTS

| | | | |
|---|---|---|---|
| 2,283,514 A | 3/1941 | Stanworth | |
| 4,813,831 A | 3/1989 | Reinauer | |
| 4,877,360 A | 10/1989 | Pfalzgraf | |
| 5,388,936 A | 2/1995 | Mihic | |
| 5,660,400 A * | 8/1997 | Kasmeier et al. | ............... 279/83 |
| 6,299,394 B1 | 10/2001 | Stojanovski | |
| 7,125,207 B2 | 10/2006 | Craig et al. | |
| 7,448,834 B2 | 11/2008 | Zollmann | |
| 2010/0066037 A1 | 3/2010 | Freyermuth et al. | |

FOREIGN PATENT DOCUMENTS

GB          2092034 A   *   8/1982   ............ B23B 31/107

* cited by examiner

*Primary Examiner* — Andrea Wellington
*Assistant Examiner* — Brendan Ayer
(74) *Attorney, Agent, or Firm* — Larry R. Meenan, Esq.

(57) ABSTRACT

A combination cutter body and a locking screw for mounting the cutter body to an adapter is disclosed. The cutter body includes a plurality of threaded bores that extend radially through a sidewall of the cutting body. The threaded bores are adapted to receive a corresponding threaded setscrew. The locking screw includes a head having a plurality of indentations around a circumference of the head. A central axis of each threaded bore is offset by a distance from a central axis of each indentation to cause an axial force to be exerted on the cutter body when an end of the setscrew engages a respective indentation to tightly seat the cutter body against the adapter.

6 Claims, 3 Drawing Sheets

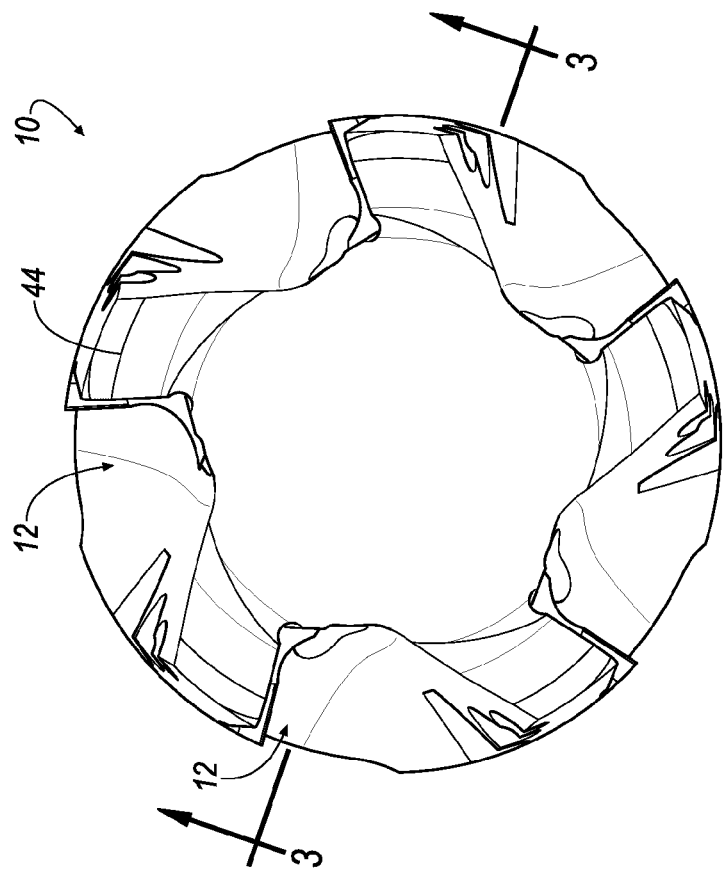
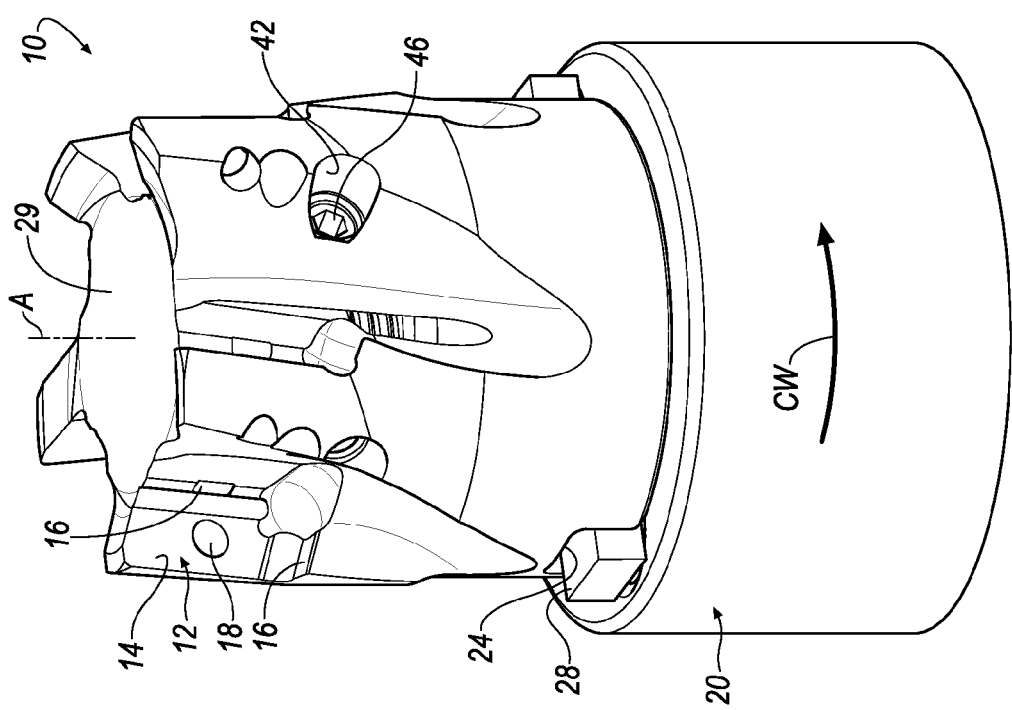

US 8,702,351 B2

CUTTER BODY AND LOCKING SCREW THEREFOR

BACKGROUND OF THE INVENTION

When milling cutter with small cutting diameters are designed with cap screw style (A-style) shell mill mountings, a thin, weak cross-sectional area 106 usually occurs in a cutter body 100 between the insert pockets (and chip gashes) 102 and the counter bore 104 for the locking screw, as shown in FIG. 5. Typically, the thin cross-sectional area 106 exhibits high stresses during a machining operation, which can lead to cracking and premature tool failure. It would be desirable to eliminate the thin, weak cross-sectional area that exists in conventional designs.

SUMMARY OF THE INVENTION

The invention solves the problem associated with the thin, weak cross-section between the insert pockets and the counterbore of the locking screw in conventional designs by eliminating the counter bore for the locking screw. The invention also permits the use of a standard milling adapter because elements of the invention reside in the cutter body.

In one aspect of the invention, a cutter body and a locking screw, in combination, comprises a cutter body including a plurality of threaded bores that extend radially through a sidewall of the cutting body, the threaded bores adapted to receive a corresponding setscrew; and a locking screw for mounting the cutter body to an adapter, the locking screw including a head having a plurality of indentations around a circumference of the head and a threaded shank, wherein an end of the setscrew engages a respective indentation in such a way that the cutter body is seated tightly against the adapter.

In another aspect, a method of mounting a cutter body to an adapter with a locking screw, the cutter body including a plurality of threaded bores extending radially through a side wall of the cutter body, the locking screw including a threaded shank and a head with a plurality of indentations around a circumference of the head, the method comprising threading the shank of the locking screw into a pilot hole of the adapter; mounting the cutter body on a pilot of the adapter; and threading a setscrew into a respective threaded bore of the cutter body such that an end of the setscrew engages a respective indentation in such a way that the cutter body is seated tightly against the adapter.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 1 is a perspective view of a cutter body and a locking screw (completely encapsulated by the cutter body) when assembled according to an embodiment of the invention;

FIG. 2 is a top view of the cutter body and the locking screw of FIG. 1;

DETAILED DESCRIPTION OF THE INVENTION

Figure 3:
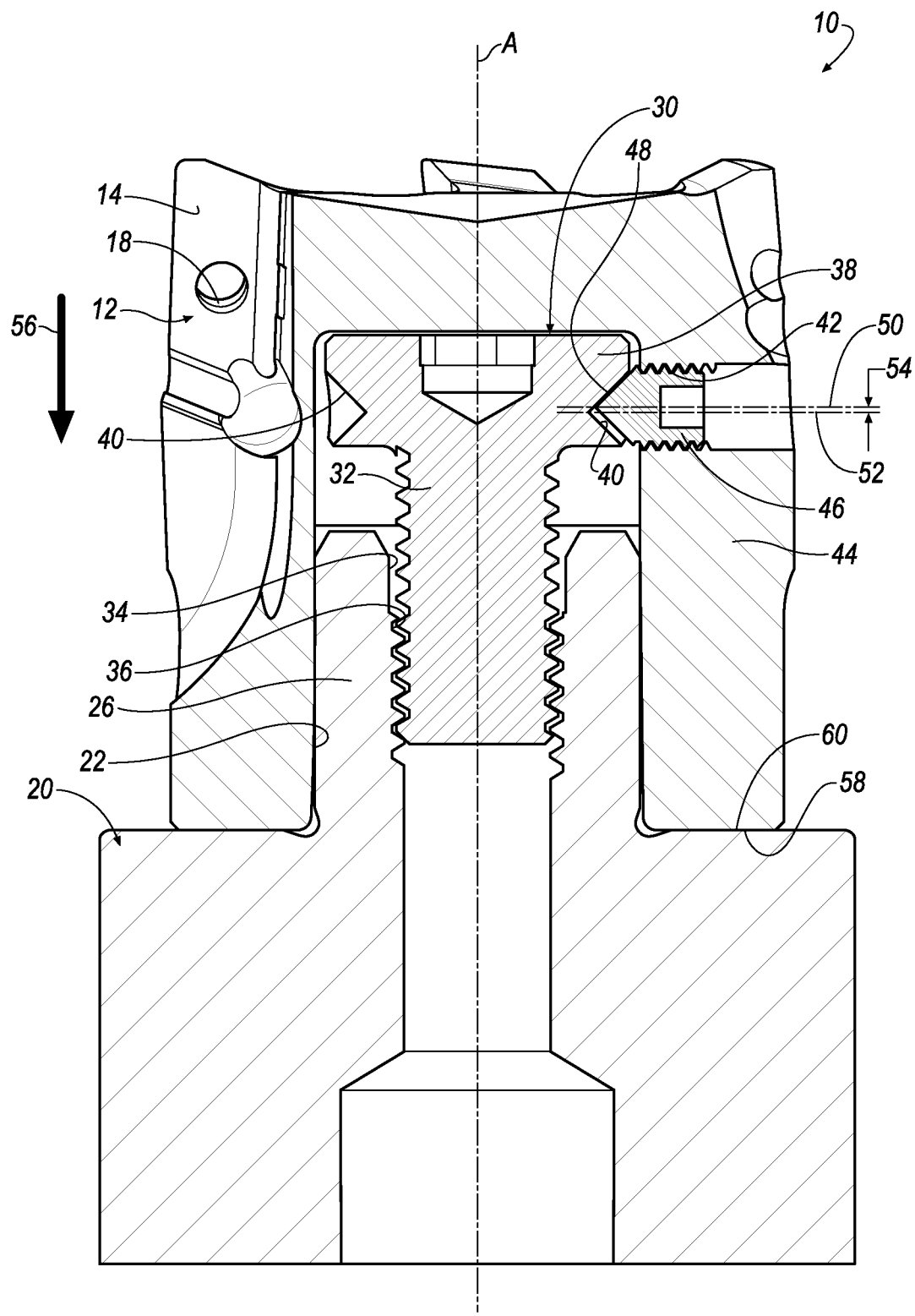
FIG. 3 is a cross-sectional view of the cutter body and the locking screw taken along line 3-3 of FIG. 2 illustrating an initial engagement between a indentation of the locking screw and a setscrew threaded into a bore of the cutter body.
Figure 5:
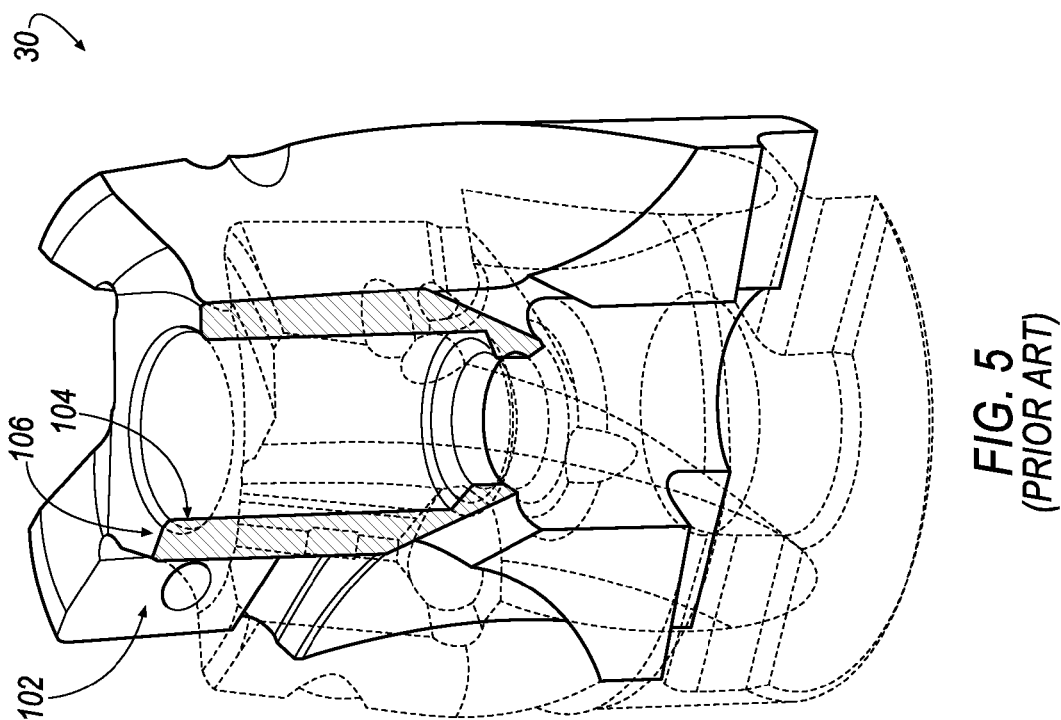
FIG. 5 is a perspective view of a conventional cutting tool.

With reference now to the drawings, wherein like numerals designate like components throughout all of the several figures, there is illustrated in FIGS. 1-3 a cutter body, as generally indicated at 10. The cutter body 10 shown is particularly suited for shell milling operations. However, the cutter body 10 may take on other forms suitable for other metalworking operations.

The cutter body 10 comprises one or more pockets 12 formed therein. The pockets 12 in the illustrated cutter body 10 are arranged axially and circumferentially in an angularly spaced relation to each other. Each pocket 12 is provided for receiving a cutting insert (not shown). Each pocket 12 comprises a substantially planar seat or base 14 and two shoulders 16. The relative angles formed by the shoulders 16 with respect to the base 14 and to each other are not important to the invention, and can be formed at any desirable relative angle. Each shoulder 16 provides a surface that abuts a corresponding surface of the cutting insert. A threaded bore 18 is provided in the vicinity of each pocket 12 for receiving a fastening screw (not shown) for securing the cutting insert within the pocket 12. The fastening screw forces the cutting insert towards the base 14 and shoulders 16 of the pocket 12 via the head of the fastening screw. Consequently, the cutting insert is attached to the cutter body 10 in a detachable or removable manner.

The cutting insert may be any suitable polygonal shape, including but not limited to a generally triangular, rectangular, square, octagonal, hexagonal, or rhombic shape. A feature common to each of these shapes is that at least two sides or surfaces operatively join or intersect to form a corner or cutting edge. It should be appreciated that the cutting insert could have a plurality of cutting edges. For example, a triangular shaped cutting insert could have three cutting edges, a rectangular or square shaped cutting insert could have four cutting edges, etc.

In the embodiment shown, the cutter body 10 is adapted to be mounted to the spindle of a milling machine via a tool holder adapter 20. The cutter body 10 has a machine engaging end which has therein a pilot hole 22 and opposing keyways or drive slots 24. The tool holder adapter 20 has a pilot 26, which seats within the pilot hole 22, and opposing drive keys 28, which engage the drive slots 24. Unlike conventional cutter bodies, the cutter body 10 of the invention has a solid top surface 29 that increases structural rigidity of the cutter body 10. The illustrated cutter body 10 is rotated about a rotary axis A in a counter-clockwise direction, indicated by the directional arrow CW shown in FIG. 1, to cut a workpiece (not shown). It should be appreciated that the tool holder adapter 20 shown is provided for illustrative purposes. The tool holder adapter 20 may be any suitable tool holder adapter.

The cutter body 10 is adapted to be mounted to the tool holder adapter 20 by a locking screw 30. The locking screw 30 has a threaded shank 32 that passes through a central axial bore 34 through the cutter body 10 and is adapted to be received in a tapped hole 36 in the pilot 26. The illustrated threaded shank 32 extends into the tool holder adapter 20 beyond the pilot 26. However, if the tool holder adapter 20 is not tapped beyond the pilot 26, a shorter threaded shank may be provided. The locking screw 30 further has a head 38 that is received in the pilot hole 22, without the need of a counter bore as in conventional cutter body designs. As seen in FIG. 1, the solid top surface 29 of the cutter body 10 enables the cutter body 10 to completely encapsulate the head 38 of the locking screw 30 when the cutter body 10 is mounted on the adapter 20.

Figure 4:
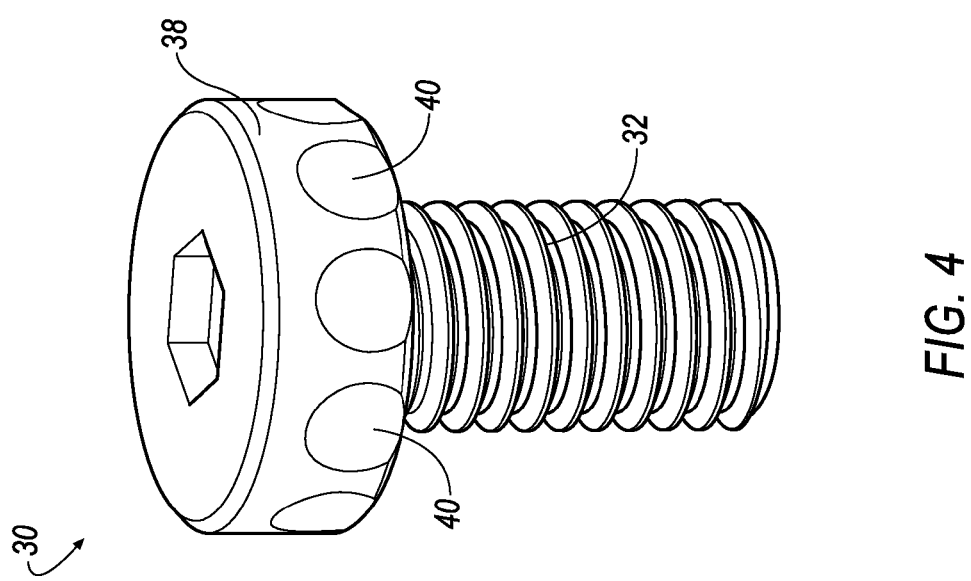
FIG. 4 is a perspective view of the locking screw according to an embodiment of the invention.

One aspect of the invention is that the head 38 includes a plurality of indentations 40 around the circumference of the head 38, as shown in FIGS. 3 and 4. As used herein, an "indentation" is defined as a cut, notch, depression or recess. In other words, the "indentation" is lower in elevation than the surrounding area.

Another aspect of the invention is that the cutter body 10 includes a plurality of radial threaded bores 42 extending completely through a sidewall 44 of the cutter body 10 and dimensioned such that one or more setscrews 46 can be threaded into a corresponding bore 42. The setscrews 46 has a sufficient length such that an end 48 of the setscrew 46 extends into the cutter body 10 and is capable of engaging a corresponding indentation 40 in the head 38 of the locking screw 30 when the setscrew 46 is threaded into a respective threaded bore 42.

In the illustrated embodiment, the indentations 40 are conical in shape (V-shaped in cross-section), and the end 48 of the setscrew 46 is conical and substantially identical in shape with the indentations 40 of the locking screw 30. However, it will be appreciated that the indentations 40 of the locking screw 30 and the end 48 of the setscrew 46 can be any complimentary shape. For example, the indentations 40 of the locking screw 30 and the end 48 of the setscrew 46 can have any tapered profile to cause the cutter body 10 to be firmly secured to the adapter 20, as described below.

It will be appreciated that the number of indentations 40 do not need to generally correspond in number to the number of threaded bores 42 (and setscrews 46) in the cutter body 10. For example, the head 38 may have a greater number of indentations 40 than the number of threaded bores 42 (and setscrews 46), as shown in the illustrated embodiment. On the other hand, the head 38 may have the same number or a lesser number of indentations 40 than the number of threaded bores 42 (and setscrew 46) in the cutter body 10.

Another aspect of the invention is that a central axis 50 of the threaded bores 42 is offset from a central axis 52 of the indentations 40 of the locking screw 30 by a distance 54 when the cutter body 10 is mounted on the adapter 20, as shown in FIG. 3. Specifically, the central axis 50 of the threaded bores 42 is slightly higher in elevation with respect to a seating surface 60 of the adapter 20 than the central axis 52 of the indentations 40. The offset distance 54 in elevation between the indentations 40 and the threaded bores 42 causes an axial force in the direction of the arrow 56 to be exerted on the cutter body and a seating surface 58 of the cutter body 10 to seat tightly against the seating surface 60 of the adapter 20, thereby firmly seating the cutter body 10 against the adapter 20.

It will be appreciated that the indentations 40 and the end 48 of the setscrew 46 being conical in shape provides a cam surface that causes the axial force in the direction of the arrow 56, as shown in FIG. 3. However, it will also be appreciated that the invention can be practiced with any desirable shape for the indentations 40 and the end 48 of the setscrew 46 that will provide a cam surface and a suitable axial force in the direction of the arrow 56 to cause the cutter body 10 to seat tightly against the adapter 20.

The patents and publications referred to herein are hereby incorporated by reference.

Having described presently preferred embodiments the invention may be otherwise embodied within the scope of the appended claims.

What is claimed is:

1. A cutting tool, comprising:
   a cutter body including a plurality of threaded bores that extend radially through a sidewall of the cutter body, the threaded bores adapted to receive a corresponding setscrew; and
   a locking screw for mounting the cutter body to an adapter, the locking screw including a head having a plurality of indentations around a circumference of the head and a threaded shank, wherein the threaded shank of the locking screw passes through a central axial bore in the cutter body and is adapted to be received in a tapped hole in a pilot of the adapter, and wherein an end of the setscrew engages a respective indentation in such a way that the cutter body is seated tightly against the adapter.

2. The cutting tool of claim 1, wherein a central axis of each threaded bore is offset by a distance from a central axis of each indentation to cause an axial force to be exerted on the cutter body to tightly seat the cutter body against the adapter.

3. The cutting tool of claim 1, wherein a number of indentations is greater than a number of threaded bores.

4. The cutting tool of claim 1, wherein each indentation is conical in shape, and wherein the end of each setscrew is conical in shape.

5. The cutting tool of claim 1, wherein the cutter body includes a solid top surface.

6. The cutting tool of claim 1, wherein the head of the locking screw is completely encapsulated by the cutter body when the cutter body is tightly seated against the adapter.

\* \* \* \* \*